US011132535B2

United States Patent
Sova (10) Patent No.: US 11,132,535 B2
(45) Date of Patent: Sep. 28, 2021

(54) AUTOMATIC VIDEO CONFERENCE CONFIGURATION TO MITIGATE A DISABILITY

(71) Applicant: Avaya Inc., Santa Clara, CA (US)

(72) Inventor: Ofer Sova, Holon (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/715,139

(22) Filed: Dec. 16, 2019

(65) Prior Publication Data

US 2021/0182544 A1 Jun. 17, 2021

(51) Int. Cl.
*G06K 9/00* (2006.01)
*H04L 12/18* (2006.01)

(52) U.S. Cl.
CPC ..... *G06K 9/00355* (2013.01); *G06K 9/00241* (2013.01); *G06K 9/00315* (2013.01); *H04L 12/1818* (2013.01); *H04L 12/1822* (2013.01); *H04L 12/1831* (2013.01)

(58) Field of Classification Search
CPC ........... G06K 9/00355; G06K 9/00241; G06K 9/00315; H04L 12/1818; H04L 12/1822; H04L 12/1831
See application file for complete search history.

(56) References Cited

U.S. PATENT DOCUMENTS

| | | | |
|---|---|---|---|
| 6,964,023 B2* | 11/2005 | Maes ................. | G06K 9/00248 715/811 |
| 8,280,434 B2* | 10/2012 | Garg ................. | H04M 1/72552 455/556.1 |
| 10,176,366 B1* | 1/2019 | Maxwell ............ | H04N 21/4788 |
| 10,460,159 B1* | 10/2019 | Shields .............. | G06K 9/00389 |
| 10,559,307 B1* | 2/2020 | Khaleghi ............ | G10L 15/26 |
| 10,573,312 B1* | 2/2020 | Thomson ............ | G10L 15/26 |
| 10,581,625 B1* | 3/2020 | Pandey .............. | H04N 7/152 |
| 2003/0154084 A1* | 8/2003 | Li ..................... | G06K 9/00228 704/273 |
| 2005/0228676 A1* | 10/2005 | Ifukube .............. | G10L 15/26 704/275 |
| 2010/0109918 A1* | 5/2010 | Liebermann ........ | G10L 15/26 341/21 |
| 2013/0254287 A1* | 9/2013 | Biswas .............. | H04L 51/32 709/204 |
| 2014/0309870 A1* | 10/2014 | Ricci ................ | A61B 5/6808 701/36 |
| 2015/0120293 A1* | 4/2015 | Wohlert ............. | G10L 21/0364 704/235 |
| 2015/0130887 A1* | 5/2015 | Thelin .............. | H04N 7/147 348/14.03 |
| 2017/0324572 A1* | 11/2017 | Biggs .............. | H04L 29/08 |
| 2017/0337692 A1* | 11/2017 | Romanenko ....... | G06K 9/00201 |
| 2018/0182375 A1* | 6/2018 | Fomin ............. | G06F 40/58 |
| 2018/0285059 A1* | 10/2018 | Zurek .............. | H04L 12/1822 |
| 2019/0052473 A1* | 2/2019 | Soni .............. | G09B 21/009 |

(Continued)

*Primary Examiner* — Blake J Rubin (74) *Attorney, Agent, or Firm* — Sheridan Ross P.C.

(57) ABSTRACT

Video conferences are a common occurrence in many business, academic, and other settings. Systems and methods provided herein enable a participant of a video conference, who has an impairment or disability, such as to hearing, speech, or vision, to have that impairment or disability mitigated by automatically detecting and implementing mitigating actions to the participants local device and/or the devices of the remote participants.

20 Claims, 5 Drawing Sheets

(56) References Cited

U.S. PATENT DOCUMENTS

| | | | |
|---|---|---|---|
| 2019/0122668 A1 | 4/2019 | Anderson | |
| 2019/0386840 A1* | 12/2019 | Griffin | H04L 12/1822 |
| 2020/0005028 A1* | 1/2020 | Gu | G06K 9/00389 |
| 2020/0077206 A1* | 3/2020 | Jensen | G06K 9/00268 |
| 2020/0110928 A1* | 4/2020 | Al Jazaery | G06K 9/4652 |
| 2020/0267259 A1* | 8/2020 | Behm | H04M 3/58 |
| 2020/0379575 A1* | 12/2020 | Banerjee | G06F 3/012 |
| 2021/0043109 A1* | 2/2021 | Mese | G09B 21/009 |

\* cited by examiner

AUTOMATIC VIDEO CONFERENCE CONFIGURATION TO MITIGATE A DISABILITY

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for video conferencing and particularly to automatic video conference component configurations.

BACKGROUND

Videoconferencing systems typically have fixed rules for how participants are displayed in a video conference. For example, the most active speaker may be displayed in a highlighted window instead of other participants or displayed larger than the other participants. While prior art practices, such as this may work well for participants that do not have a disability, it may cause problems for participants who do have a disability.

SUMMARY

Systems and methods are disclosed herein wherein a video call may be analyzed and determine whether any of the participants have a disability by monitoring different characteristics of each participant. For example, the system may monitor the participant's voice characteristics, hand gestures (e.g., use of sign language), gaze (e.g. does not look directly at the video conference, which may indicate blindness), facial expressions, physical features, and/or the like to try and identify if the participant as a disability (e.g., is partially or totally blind, deaf, speech impaired, etc.). In response, the systems and methods described herein auto-configure the disabled participant's display.

In one embodiment, for a participant that is determined to be hard of hearing, the systems and methods can auto-configure the video conference displayed to the disabled participant to show multiple active speakers, such as to better enable the participant to read lips. The video of the other, non-active participants may be placed in the background while the active speaker(s) are shown in a separate window in the display. In other words, the display of the video conference to the disabled participant is dynamically changed based on detection of the disability.

In another embodiment, for a person that is determined to be partially blind, the systems and methods can auto-configure the size of the image of the active speaker to be larger than that utilized for non-vision impaired participants. Additionally, or alternatively, only the active speaker may be shown.

In another embodiment, for a person that is determined to be speech impaired, the systems the systems and methods may dynamically change the view displayed to the other participants to display a voice-to-text translation (e.g., based on prior configurations and/or frequency of words/phrases encountered over time, such as in previous calls with the same participant(s)).

In another embodiment, having a plurality of individuals, each having a different disability, such as a participant with a speech impediment, a participant who is partially blind, and a participant with no disabilities, then the features displayed on each participant's device may be different based on the different types of disabilities. For example, the view of the non-disabled participant may have a text translation from the participant with the speech impediment and an unchanged view from the partially blind participant. The view of the partially blind participant may have an enlarged active speaker and a voice translation (instead of a text translation). The view of the participant with the speech impediment may be unchanged from the non-disabled participant/partially blind participant.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising: at least one processor with a memory; a user input-output device; a network interface to enable the at least one processor to communicate via a network; and wherein the user input-output devices comprises a camera; and wherein the at least one processor: conducts a video conference as a node on a network and communicating via the network with a number of remote nodes associated with a number of remote participants; receives an image a local participant of the video conference; determines the image comprises indicia of a disability, wherein the disability impairs the local participant for at least one of speech, hearing, or vision; in response the determination that the image comprises indicia of the disability, altering an operational characteristic of the user input-output device to mitigate the disability for the video conference with respect to the at least one of speech, hearing, or vision utilized to participate in the video conference.

In another embodiment, a method is disclosed, comprising: conducting a video conference over a network comprising a local node, utilized by a local participant, and a number of remote nodes associated with a number of remote participants; receiving an image a local participant of the video conference; determining the image comprises indicia of a disability, wherein the disability impairs the local participant for at least one of speech, hearing, or vision; and in response the determination that the image comprises indicia of the disability, altering an operational characteristic of the user input-output device to mitigate the disability for the video conference with respect to the at least one of speech, hearing, or vision utilized to participate in the video conference.

In another embodiment, a system is disclosed comprising: means to conducts a video conference as a node on a network and communicating via the network with a number of remote nodes associated with a number of remote participants; means to receive an image a local participant of the video conference; means to determine the image comprises indicia of a disability, wherein the disability impairs the local participant for at least one of speech, hearing, or vision; means to, in response the determination that the image comprises indicia of the disability, alter an operational characteristic of the user input-output device to mitigate the disability for the video conference with respect to the at least one of speech, hearing, or vision utilized to participate in the video conference.

Also, while the disclosure is presented in terms of exemplary embodiments, it should be appreciated that individual aspects of the disclosure can be separately claimed. Aspects of the embodiments include the systems and methods, further comprising:

a data storage comprising records, each record comprising a graphical attribute and an associated disability; and wherein the at least one processor determines that the image comprises the indicia of the disability further comprising the at least one processor determining that the image comprises a captured attribute that matches the graphical attribute of at least one of the records.

The user input-output device further comprises a display visually presenting the video conference; and wherein the at least one processor determines that the image comprises the indicia of the disability upon the at least one processor further determining that the graphical attribute comprises at least one of a head position or eye position of the local participant associated with the local participant directing their gaze to a location other than towards the visual display device and wherein the disability comprises a vision disability.

The user input-output device further comprises a display visually presenting the video conference; and wherein the at least one processor determines that the image comprises the indicia of the disability upon the at least one processor further determining that the graphical attribute comprises at least one of a head position or eye position of the local participant associated with the local participant wearing dark glasses and wherein the disability comprises a vision disability.

Wherein the at least one processor determines that the image comprises the indicia of the disability upon the at least one processor further determining that the graphical attribute comprises hand gestures while the local participant is speaking and wherein the disability comprises a hearing disability.

Wherein the at least one processor determines that the image comprises the indicia of the disability upon the at least one processor further determining that the graphical attribute comprises asymmetric facial movement and wherein the disability comprises a speech disability.

Wherein the user input-output device further comprises a microphone receiving speech from the local participant; and the at least one processor determines that the image comprises the indicia of the disability upon the at least one processor further determining that the facial gestures while providing speech to the microphone occur at a pace slower than a previously determined threshold pace and wherein the disability comprises a speech disability.

Wherein the at least one processor alters the operational characteristic of the user input-output device to mitigate the disability for the video conference, further comprising, presenting an image of a first active speaker, of the number of remote participants, on the input-output device with additional magnification of the mouth region of the first active speaker to facilitate lip reading by the local participant.

Wherein the at least one processor alters the operational characteristic of the user input-output device to mitigate the disability for the video conference, further comprising, continuously presenting an image of the first active speaker and a second active speaker, of the number of remote participants, when engaged in a back-and-forth dialog therebetween, with additional magnification of the mouth region of each of the first active speaker and the second active speaker to facilitate lip reading of each of the first active speaker and the second active speaker by the local participant.

Wherein the at least one processor alters the operational characteristic of the user input-output device to mitigate the disability for the video conference, further comprising, generating text from speech received by the number of remote participants and presenting the generated text on the input-output device.

The user input-output device further comprises a microphone receiving speech from the local participant; and a data storage comprising records of sound cues associated with speech previously provided by the local user and associated text; and wherein the at least one processor alters the operational characteristic of the user input-output device to mitigate the disability for the video conference, further comprising, the microphone receiving a sound cue from the local user and the at least one processor accessing a record of the sound cues and accessing the associated text and providing the associated text to each of the number of remote participants.

Wherein the number of remote participants is zero and occurs prior to any of the number of remote participants joining the video conference.

Wherein the user input-output devices comprises a plurality of input-output devices.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or arts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
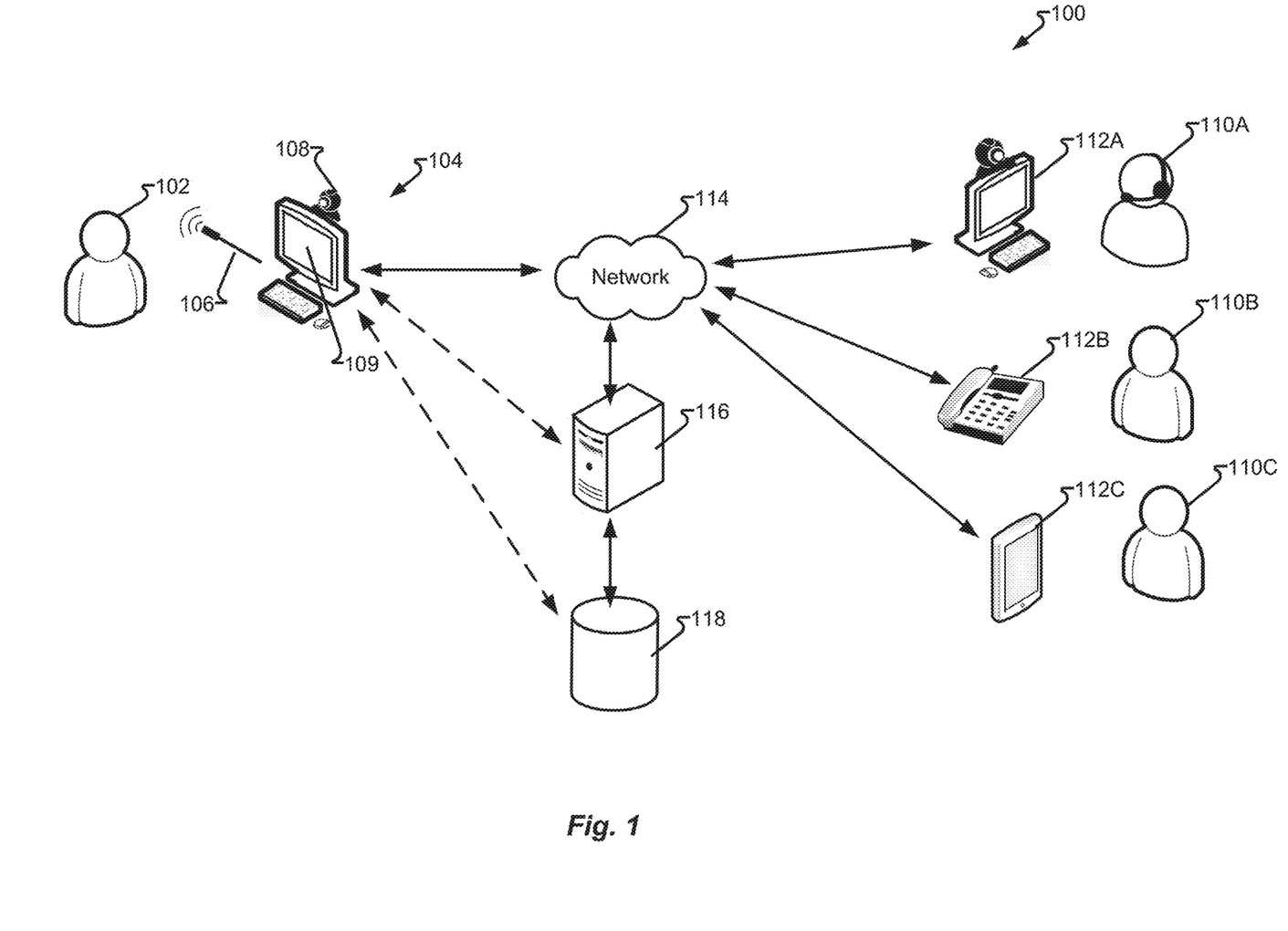
FIG. 1 depicts a first system in accordance with embodiments of the present disclosure.

FIG. 1 depicts system 100 in accordance with embodiments of the present disclosure. In one embodiment, a video conference is (or will be) conducted between local participant 102 utilizing local node 104 and a number of remote participants 110 utilizing a number of remote nodes 112. Local node 104 may comprise one or more user input-output devices including, microphone 106, camera 108, display 109 and/or other component. In one embodiment, the only participant is local participant 102, such as prior to the video conference being joined by at least one other remote participant 110. As will be described with respect to certain embodiments herein, capturing an image of local participant 102 with camera 108 and/or speech from local participant 102 by microphone 106 may be performed without any of the remote participants 110 currently participating in the video conference. In other embodiments, one or more remote participant 110, via their respective remote node 112, are participating in the video conference utilizing, at least, network 114. Network 114, may be one or more data networks and include, but not limited to, the internet, WAN/LAN, WiFi, telephony (plain old telephone system (POTS), session initiation protocol (SIP), voice over IP (VoIP), cellular, etc.), or other network or combinations thereof when enabled to convey audio video data of a video conference.

Server 116 may comprise one or more processors and managing the video conference, such as floor control, adding/dropping participants, muting/unmuting audio for selected participants, moderator control, etc. Server 116, and the one or more processors, may further comprise one or more hardware devices utilized for data processing (e.g., cores, blades, stand-alone processors, etc.) with a memory incorporated therein or accessible to the one or more processors. Data storage device 118 provides accessible data storage to the one or more processors, such on a network storage device, internal hard drive, platters, disks, optical media, magnetic media, and/or other non-transitory device or combination thereof. System 100 may be embodied as illustrated wherein server 116 and data storage device 118 are distinct from local node 104. In other embodiments, one or both of server 116 and data storage device 118 may be provided by local node 104 or via direct or alternate data channel when not integrated into local node 104.

Remote participant 110 may utilize remote node 112 which is variously embodied. While a video conference may preferably have each remote participant 110 utilize a camera, microphone, and display operable to present images from the video conference, this may not be required. For example, remote participant 110B may utilize remote node 112B embodied as an audio-only telephone. Accordingly, the video conference may omit any image of remote participant 110B or utilize a generated or alternate image, such as a generic image of a person. With respect to the embodiments that follow, the video conference comprises audio-video information from and to local node 104 and more generally to embodiments wherein audio-video information is further provided to and from at least one remote node 112.

Local participant 102 may have a physical disability or impairment that may affect their ability to participate, as a contributor and/or as a receiver, of the video conference. For example, a disability with respect to vision, hearing, and/or speaking. While many prior art solutions enable a disabled participant to utilize other forms of communication within a video conference, such as typing text messages in stead of speaking, participants may not wish to identify themselves as impaired or interrupt the conversational flow of a meeting conducted via a video conference with alternative methods of participating, like typing text when other participants are in a rapid back-and-forth discussion, such as when participants speak for a short period of time before another participant begins speaking, such as when only a few words are spoken by one participant before another participant begins speaking or when participants "talk over" other participants. Disabled participants may not want to identify themselves as disabled or not be aware of alternative communication methodologies available during a video conference.

In one embodiment, camera 108 captures an image of local participant 102 and at least one processor, such as of local node 104 and/or server 116, analyzes the image and determines that an indication of a disability is present with respect to local participant 102. In response, the at least one processor may alter one or more components utilized in a video conference to mitigate the effects of the disability on the participant's ability to engage with the video conference to the extent desired. The alteration may comprise changes to a display device presenting the graphical portion of a video conference, audio device presenting the audio portion of the video conference, and/or content provided by local node 104 or a component thereof (e.g., camera 108, microphone 106) to the video conference for presentation by remote node(s) 112, as will be described more completely with respect to embodiments that follow.

It should be appreciated that local node 104 may be or comprise an input-output device. In other embodiments, input-output devices may be integrated into local node 104 or attached as peripheral devices (e.g., attached microphone 106, attached camera 108, etc.) or other devices having a combination of input-output device functions, such as a camera with integrated microphone, headset with microphone and speakers, etc., without departing from the scope of the embodiments herein.

Figure 2:
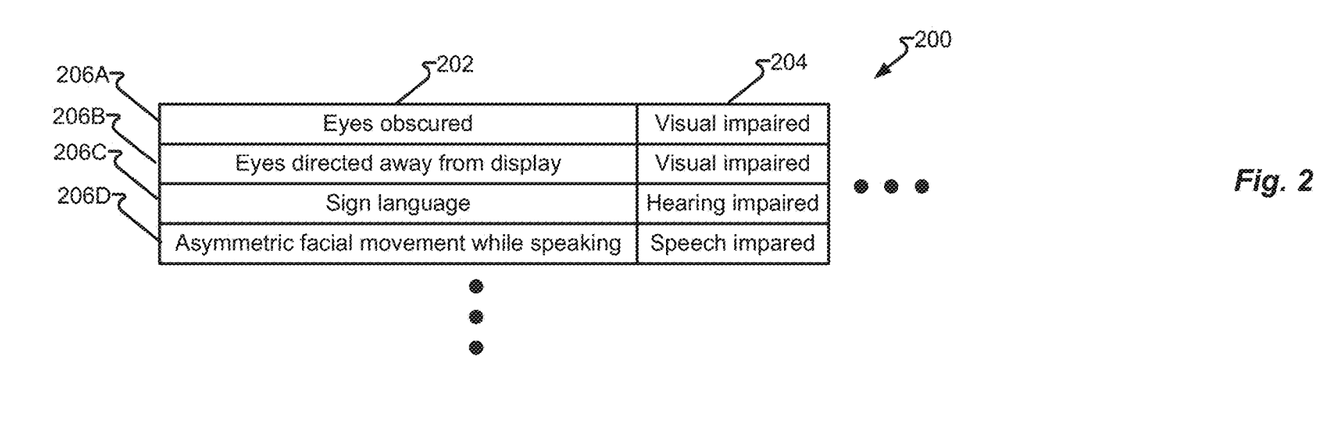
FIG. 2 depicts a first data structure in accordance with embodiments of the present disclosure.

FIG. 2 depicts data structure 200 in accordance with embodiments of the present disclosure. In one embodiment, at least one processor receives an image of local participant 102 by camera 108. The image is analyzed to determine if a disability is present. In one embodiment, the at least one processor accesses data structure 200, such as may be maintained in a memory and/or data storage device 118 and compares the image to records 206. Records 206 comprise a graphical attribute field 202 and associated impairment or disability field 204. Upon matching a portion of the image of local participant 102 to one value in the graphical attribute field 202, the at least one processor then determines an indicia of a disability, as identified in the associated value for disability field 204, is present.

It should be appreciated that with graphical attribute field 202 comprises a textual description, implementations may comprise images, algorithmic portions, and/or image attributes or other image descriptors. For example, record 206C may comprise data values or structures that are utilized to determine if local participant 102 is utilizing sign language, such as by identifying portions of the image containing images of the hands of local participant 102 and their motion above a certain threshold or even consistent with making signing gestures. This may be an algorithm that determines the change in pixels in the bottom third of an image of local participant 102 contain an above-threshold number of pixels in motion (e.g., data values of a set of pixels are substantially constant but relocated over a short (e.g., <1 second) period of time). In another example, record 206A may contain within graphical attribute field 202 a number of images of participants and the relative position of the participants head and/or eyes from known or believed to be, non-sight impaired participants. An aggregate image or aggregate attribute (e.g., pupil in the horizontal center and slightly below the horizon—when the display is located below the camera) may be utilized to determine that a participant is viewing the video conference. A deviation from the aggregate attribute may indicate that local participant 102 has a vision impairment and, in whole or in part, may benefit from an alteration of the presentation of the video conference in accordance with the indicia of the disability which may be provided by the associated value of disability field 204.

As indicated by the ellipses, data structure 200 may comprise additional records 206 and/or additional fields, such as may be configured for a specific local participant 102, identifiers, references to other data sources, or other data as a matter of design choice.

Figure 3:
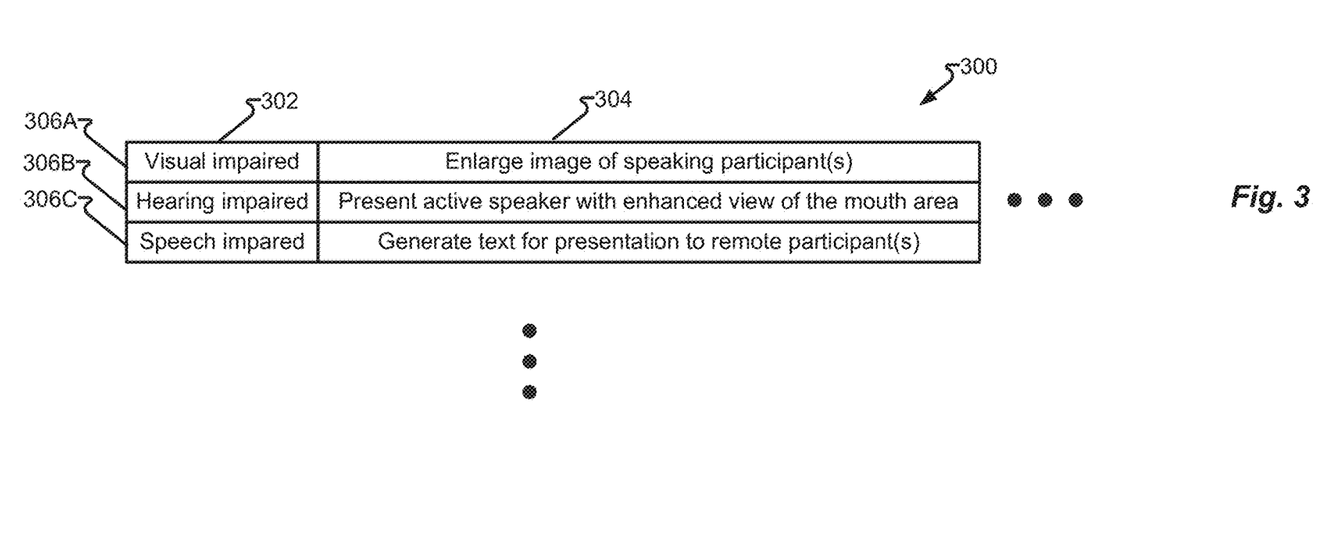
FIG. 3 depicts a second data structure in accordance with embodiments of the present disclosure.

FIG. 3 depicts data structure 300 in accordance with embodiments of the present disclosure. In one embodiment, data structure 300 comprises records 306, each of records 306 comprising at least disability field 302 and mitigation field 304. Data structure 300 may be maintained in a memory, data storage device 118, or other component accessible to the at least one processor. In another embodiment, the at least one processor receives indicia of a disability, such as indicia having a value matching disability field 302 within a record 306. In response, the associated value of mitigation field 304 is accessed and executed by the at least one processor to implement the mitigation.

As indicated by the ellipses, data structure 200 may comprise additional records 306 and/or additional fields, such as may be configured for a specific local participant 102, identifiers, references to other data sources, or other data as a matter of design choice.

Figure 4:
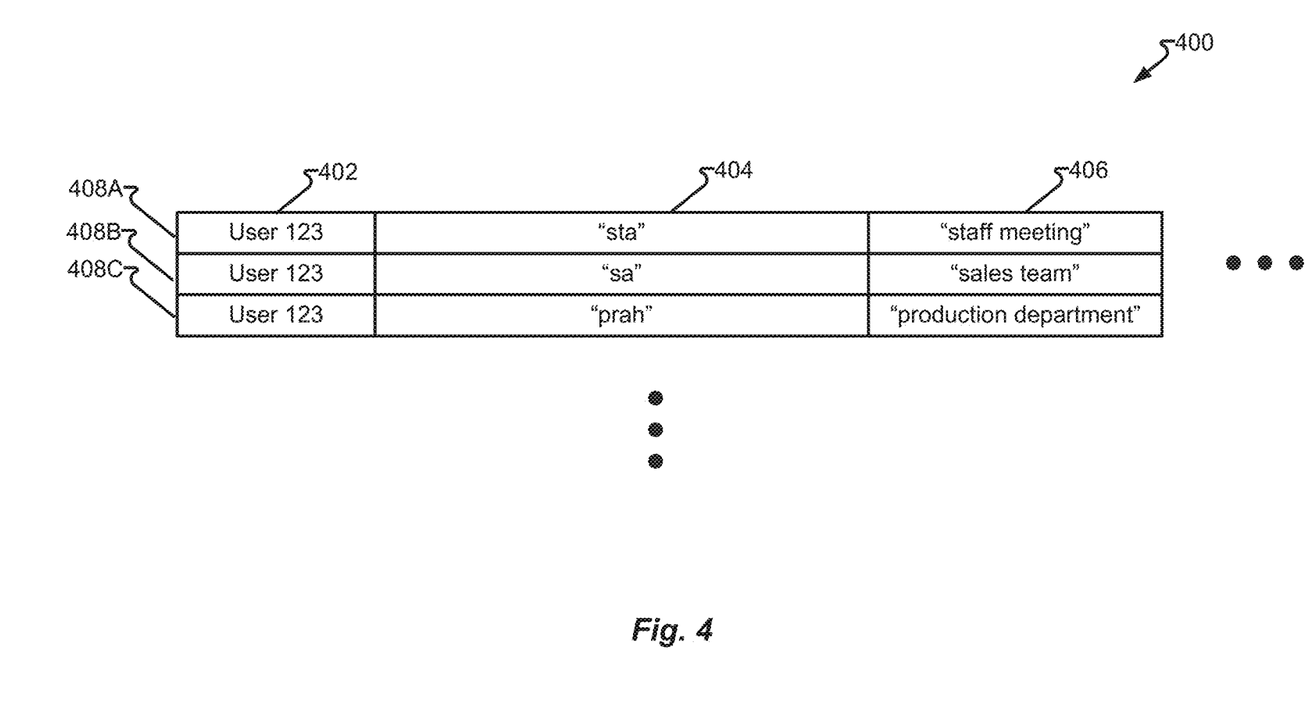
FIG. 4 depicts a third data structure in accordance with embodiments of the present disclosure.

FIG. 4 depicts data structure 400 in accordance with embodiments of the present disclosure. In one embodiment, local participant 102 is identified as having a speech impairment. Data structure 400 comprises fields, such as identification of a specific local participant 102 in user field 402, speech cue 404, and a textual counterpart 406 and may be maintained in a memory or data storage device 118 or other data repository accessible to the at least one processor.

The at least one processor, receiving speech from microphone 106 of local participant 102 having a speech disability may be able to provide audible speech cues. The at least one processor, upon matching the speech cue with at least one of records 408 having an equivalent value in speech cue 404 field, may then insert the associated text from textual counterpart 406 for presentation on remote nodes 112. The presentation may be inserted into the video portion of the video conference provided by local node 104 or a separate text channel of the video conference.

Figure 5:
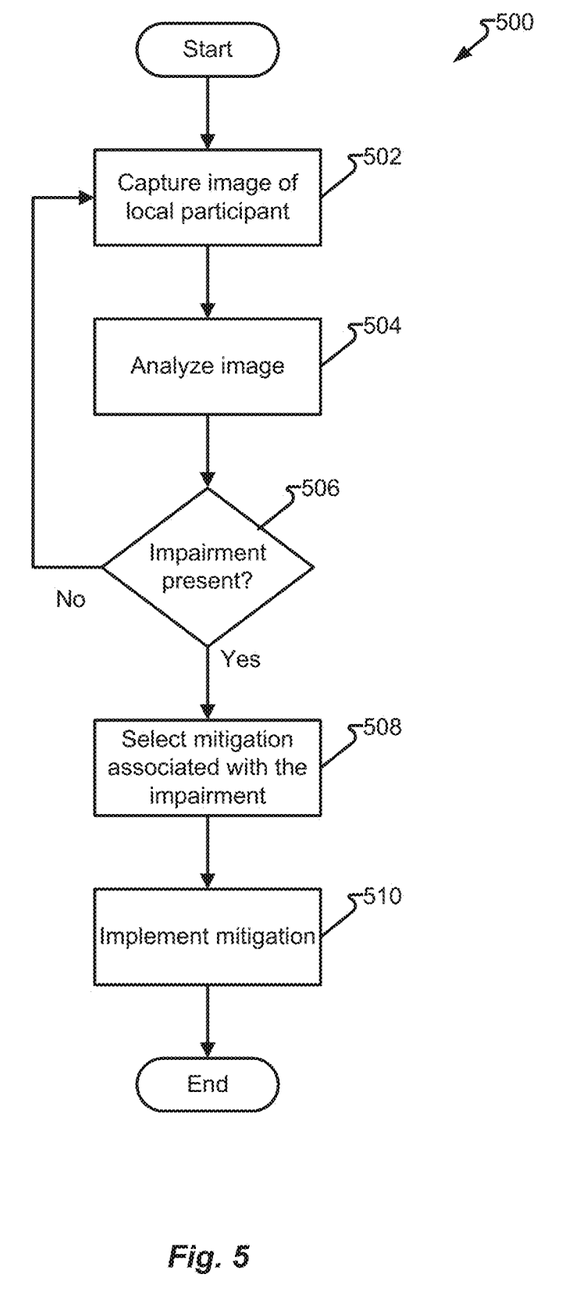
FIG. 5 depicts a process in accordance with embodiments of the present disclosure.

FIG. 5 depicts process 500 in accordance with embodiments of the present disclosure. Process 500 may be executed by at least one processor, such as a microprocessor of local node 104, server 116, or other computing device or combination thereof when encoded as machine-executable instructions and maintained on a non-transitory storage device, such as data storage device 118 and/or a memory associated with the at least one processor. In one embodiment, process 500 begins and step 502 captures an image of local participant 102. Step 504 analyzes the image to determine if an impairment is present affecting the ability of local participant 102 to receive and/or contribute to the content of a video conference. In one example, the at least one processor may access a data record, such as one of records 206 of data structure 200 and match a portion of the image to a value for graphical attribute field 202 and, therefrom an associated value for disability field 204. If, in test 506, a disability is determined to be present, processing continues to step 508. If test 506 is determined in the negative, processing may loop back to step 502 or, alternatively, process 500 may end.

Step 508 selects a modification to apply to at least one audio-video component utilized for the video conference and, in step 510, implements the mitigation. Process 500 may end upon execution of step 510 or, alternatively, loop back to step 502 to determine if additional or alternative mitigations may be necessary.

As one example, local participant 102 may be determined to have a hearing impairment by step 504 and test 506. As a result, step 508 may select an option to present an image of a speaking remote participant 110 in an enlarged format on display 109, such as to enable the mouth of the speaking participant to be more prominent and better facilitate lip reading. Additionally, or alternatively, non-speaking remote participants 110 may be further reduced in size as presented on display 109 or omitted entirely.

In a further example, two or more remote participant 110 are engaged in a discussion. This may be a rapid back-and-forth discussion or a more metered discussion between the two (or more) most active speakers contributing speech to the video conference. The at least one processor may then enlarge the image of only the active speakers to allow a hearing impaired local participant 102 to better lip read and receive the content of the interaction.

Figure 6:
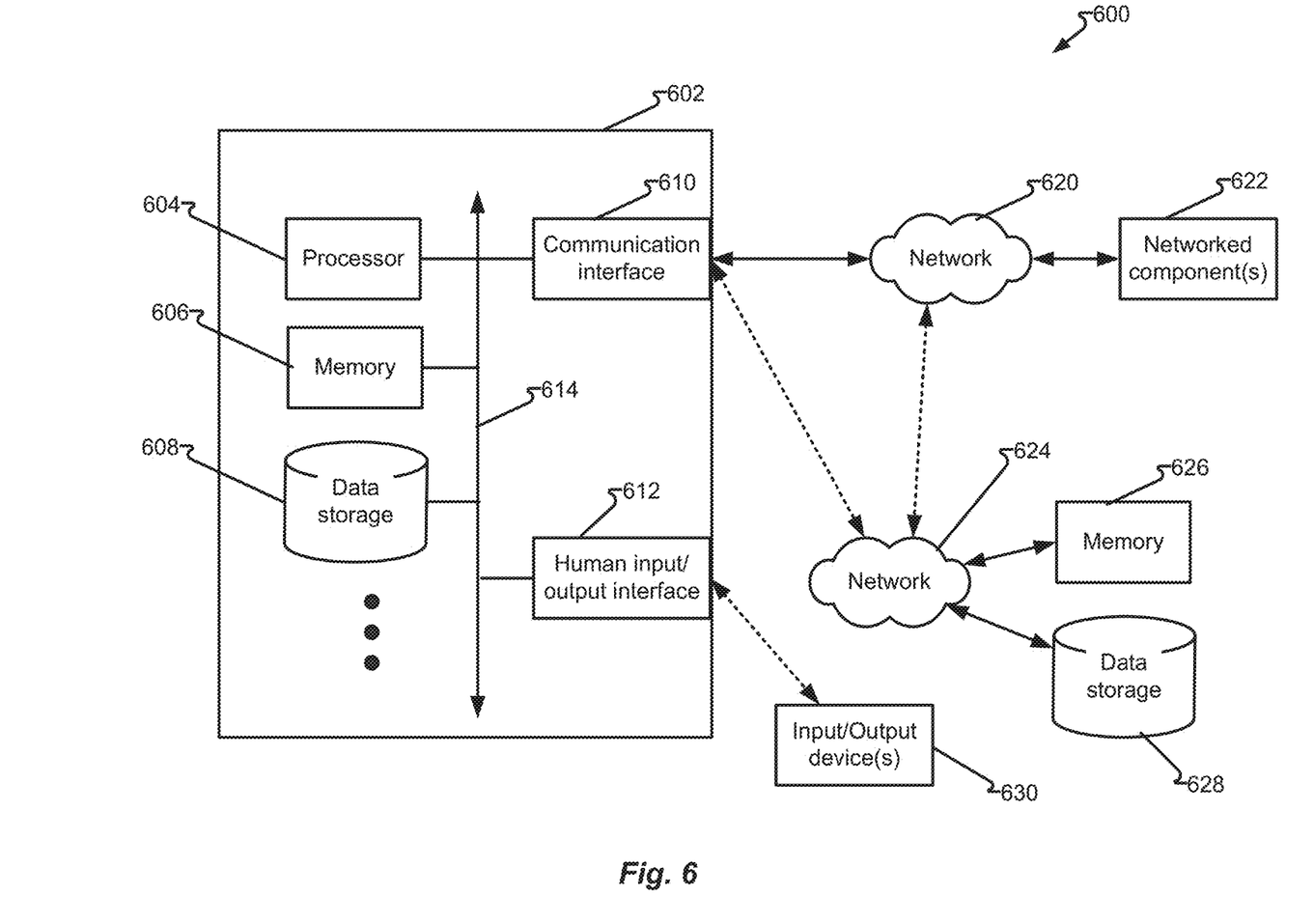
FIG. 6 depicts a second system in accordance with embodiments of the present disclosure.

FIG. 6 depicts system 600 in accordance with embodiments of the present disclosure. In one embodiment, local node 104 may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally, or alternatively, input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, input/output interface 612. Communication interface 610 may be configured to communicate directly with a networked component or utilize one or more networks, such as network 620 and/or network 624.

Network 114 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622.

Additionally, or alternatively, one or more other networks may be utilized. For example, network 624 may represent a second network, which may facilitate communication with components utilized by device 602. For example, network 624 may be an internal network to contact center #02 whereby components are trusted (or at least more so) that network components 622, which may be connected to network 620 comprising a public network (e.g., Internet) that may not be as trusted. Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via input/output interface 612 and/or via communication interface 610 either directly, via network 624, via network 620 alone (not shown), or via networks 624 and 620.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624 Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   at least one processor with a memory;
   a user input-output device;
   a network interface to enable the at least one processor to communicate via a network; and
   wherein the user input-output device comprises a camera; and
   wherein the at least one processor:
   conducts a video conference as a node on a network and communicates via the network with a number of remote nodes associated with a number of remote participants;
   receives an image from the user input-output device, the image comprising a local participant of the video conference;
   determines that the image comprises indicia of a disability, wherein the disability impairs the local participant for at least one of speech, hearing, and vision;
   in response to the determination that the image comprises indicia of the disability, altering an operational characteristic of the user input-output device to mitigate the disability for the video conference with respect to the at least one of speech, hearing, and vision utilized to participate in the video conference.

2. The system of claim 1, further comprising:
   a data storage comprising records, each record comprising a graphical attribute and an associated disability; and
   wherein the at least one processor determines that the image comprises the indicia of the disability further comprising the at least one processor determining that the image comprises a captured attribute that matches the graphical attribute of at least one of the records.

3. The system of claim 2, wherein:
   the user input-output device further comprises a display visually presenting the video conference; and
   wherein the at least one processor determines that the image comprises the indicia of the disability upon the at least one processor further determining that the graphical attribute comprises at least one of a head position or eye position of the local participant associated with the local participant directing their gaze to a location other than towards the display and wherein the disability comprises a vision disability.

4. The system of claim 2, wherein:
   the user input-output device further comprises a display visually presenting the video conference; and
   wherein the at least one processor determines that the image comprises the indicia of the disability upon the at least one processor further determining that the graphical attribute comprises at least one of a head position or eye position of the local participant associated with the local participant wearing dark glasses and wherein the disability comprises a vision disability.

5. The system of claim 2, wherein the at least one processor determines that the image comprises the indicia of the disability upon the at least one processor further determining that the graphical attribute comprises hand gestures while the local participant is speaking and wherein the disability comprises a hearing disability.

6. The system of claim 2, wherein the at least one processor determines that the image comprises the indicia of the disability upon the at least one processor further determining that the graphical attribute comprises asymmetric facial movement and wherein the disability comprises a speech disability.

7. The system of claim 2, wherein:
   the user input-output device further comprises a microphone receiving speech from the local participant; and
   the at least one processor determines that the image comprises the indicia of the disability upon the at least one processor further determining that facial gestures while providing speech to the microphone occur at a pace slower than a previously determined threshold pace and wherein the disability comprises a speech disability.

8. The system of claim 1, wherein the at least one processor alters the operational characteristic of the user input-output device to mitigate the disability for the video conference, further comprising, presenting an image of a first active speaker, of the number of remote participants, on the user input-output device with additional magnification of a mouth region of the first active speaker to facilitate lip reading by the local participant.

9. The system of claim 1, wherein the at least one processor alters the operational characteristic of the user input-output device to mitigate the disability for the video conference, further comprising, continuously presenting an image of a first active speaker and a second active speaker, of the number of remote participants, when engaged in a back-and-forth dialog therebetween, with additional magnification of a mouth region of each of the first active speaker and the second active speaker to facilitate lip reading of each of the first active speaker and the second active speaker by the local participant.

10. The system of claim 1, wherein the at least one processor alters the operational characteristic of the user input-output device to mitigate the disability for the video conference, further comprising, generating text from speech received by the number of remote participants and presenting the generated text on the user input-output device.

11. The system of claim 1, further comprising:
the user input-output device further comprises a microphone receiving speech from the local participant; and
a data storage comprising records of sound cues associated with speech previously provided by the local participant and associated text; and
wherein the at least one processor alters the operational characteristic of the user input-output device to mitigate the disability for the video conference, further comprising, the microphone receiving a sound cue from the local participant and the at least one processor accessing a record of the sound cues and accessing the associated text and providing the associated text to each of the number of remote participants.

12. The system of claim 1, wherein the number of remote participants is zero and wherein the at least one processor receives the image from the user input-output device and determines the image comprises indicia of the disability prior to any of the number of remote participants joining the video conference.

13. The system of claim 1, wherein the user input-output devices comprises a plurality of user input-output devices.

14. A method, comprising:
conducting a video conference over a network comprising a local node, utilized by a local participant, and a number of remote nodes associated with a number of remote participants;
receiving an image of the local participant of the video conference;
determining that the image comprises indicia of a disability, wherein the disability impairs the local participant for at least one of speech, hearing, and vision; and
in response the determination that the image comprises indicia of the disability, altering an operational characteristic of a user input-output device to mitigate the disability for the video conference with respect to the at least one of speech, hearing, and vision utilized to participate in the video conference.

15. The method of claim 14, wherein:
accessing a record, of a number of records, from a data storage device, each record comprising a graphical attribute and an associated disability; and
wherein the step of determining that the image comprises the indicia of the disability comprising determining that the image comprises a captured attribute that matches the graphical attribute of the records.

16. The method of claim 15, further comprising:
presenting the video conference on a display associated with the local participant; and
determining that the image comprises the indicia of the disability further comprising determining that the graphical attribute comprises at least one of a head position or eye position of the local participant associated with the local participant directing their gaze to a location other than towards a visual display device and wherein the disability comprises a vision disability; and
presenting an image of a first active speaker, of the number of remote participants, on the display with additional magnification of a mouth region of the first active speaker to facilitate lip reading by the local participant.

17. The method of claim 15, wherein determining that the image comprises the indicia of the disability further comprises determining that the graphical attribute comprises hand gestures while the local participant is speaking and wherein the disability comprises a hearing disability.

18. The method of claim 17, further comprising presenting an image of a first active speaker, of the number of remote participants, on an input-output device with additional magnification of a mouth region of the first active speaker to facilitate lip reading by the local participant.

19. The method of claim 14, further comprising:
receiving speech from the local participant; and
accessing a record, of a number of records, from a data storage device, each record comprising speech previously provided by the local participant and associated text; and
upon determining the speech comprises a sound cue from the local participant, accessing the text from the record and providing the associated text to each of the number of remote participants.

20. A system comprising:
means to conduct a video conference as a node on a network and communicate via the network with a number of remote nodes associated with a number of remote participants;
means to receive an image of a local participant of the video conference;
means to determine that the image comprises indicia of a disability, wherein the disability impairs the local participant for at least one of speech, hearing, or vision;
means to, in response to the determination that the image comprises indicia of the disability, alter an operational characteristic of a user input-output device to mitigate the disability for the video conference with respect to the at least one of speech, hearing, or vision utilized to participate in the video conference.

* * * * *